(12) United States Patent
Arrowsmith et al.

(10) Patent No.: US 9,765,670 B2
(45) Date of Patent: Sep. 19, 2017

(54) REDUCTANT INJECTION IN AN EXHAUST SYSTEM

(71) Applicant: Liebherr Machines Bulle SA, Bulle (CH)

(72) Inventors: Duncan J Arrowsmith, Newark (GB); Diego Simón Davila, Gainsborough (GB); Brian G Bates, Lincoln (GB); Nicolas Belle, Les Sciernes d'Albeuve (CH); Nicolas Talavera, Bulle (CH); Regis Vonarb, La Tour de Treme (CH)

(73) Assignee: Liebherr Machines Bulle SA, Bulle (CH)

( * ) Notice: Subject to any disclaimer, the term of this patent is extended or adjusted under 35 U.S.C. 154(b) by 0 days.

(21) Appl. No.: 14/784,021

(22) PCT Filed: Mar. 24, 2014

(86) PCT No.: PCT/IB2014/060095
§ 371 (c)(1),
(2) Date: Oct. 12, 2015

(87) PCT Pub. No.: WO2014/167443
PCT Pub. Date: Oct. 16, 2014

(65) Prior Publication Data
US 2016/0047288 A1    Feb. 18, 2016

(30) Foreign Application Priority Data
Apr. 12, 2013  (GB) .................................. 1306688.1

(51) Int. Cl.
*F01N 3/00*      (2006.01)
*F01N 3/28*      (2006.01)
(Continued)

(52) U.S. Cl.
CPC ........ *F01N 3/2892* (2013.01); *B01F 3/04049* (2013.01); *B01F 5/0473* (2013.01);
(Continued)

(58) Field of Classification Search
USPC .......... 60/274, 286, 295, 297, 301, 303, 324
See application file for complete search history.

(56) References Cited

U.S. PATENT DOCUMENTS 8,511,075 B2 *  8/2013  Brown ................... F01N 3/025
                                                    60/300
8,745,975 B2 *  6/2014  Jaruvatee .............. B01F 5/0471
                                                    60/303
(Continued)

FOREIGN PATENT DOCUMENTS

EP       2465602 A2     6/2012
WO     2011106487 A1    9/2011

OTHER PUBLICATIONS

Intellectual Property Office of Great Britain, Search Report Issued in Patent Application No. GB1306688.1, Date of Jun. 24, 2013, 1 page.
(Continued)

*Primary Examiner* — Binh Q Tran
(74) *Attorney, Agent, or Firm* — McCoy Russell LLP

(57) ABSTRACT

An engine exhaust system comprising an exhaust pipe routing an exhaust flow through a bend, and being in fluid communication with a catalyst downstream of the bend. An injector mounted to the exterior of the exhaust pipe, the injector with a tip disposed within the exhaust pipe at the bend, for injecting liquid reductant into the exhaust pipe. A shield member mounted in the exhaust pipe, the shield member comprising a generally tubular or frustoconical structure having a proximal and a distal end, the proximal end being disposed such that the injection tip is inside the shield member, the distal end being disposed towards a
(Continued)

centerline of the exhaust pipe. A vane mounted in relation to the shield member, the vane being arranged to direct a proportion of exhaust flow from upstream of the bend in a substantially arcuate path into the proximal end of the shield member.

20 Claims, 7 Drawing Sheets

(51) Int. Cl.
*B01F 5/04* (2006.01)
*B01F 3/04* (2006.01)
*F01N 3/20* (2006.01)

(52) U.S. Cl.
CPC ............ *B01F 5/0498* (2013.01); *F01N 3/206* (2013.01); *F01N 3/2066* (2013.01); *F01N 2240/20* (2013.01); *F01N 2610/00* (2013.01); *F01N 2610/02* (2013.01); *F01N 2610/1453* (2013.01); *Y02T 10/24* (2013.01)

(56) References Cited

U.S. PATENT DOCUMENTS

| | | | | |
|---|---|---|---|---|
| 8,747,761 B2* | 6/2014 | Kageyama | ............ | F01N 3/2892 422/168 |
| 8,756,921 B2* | 6/2014 | Troxler | ................ | F01N 3/2066 60/274 |
| 8,916,101 B2* | 12/2014 | Iljima | .................. | F01N 3/2066 422/169 |
| 9,217,348 B2* | 12/2015 | Kimura | ................ | F01N 3/2066 |
| 2008/0022663 A1* | 1/2008 | Dodge | ................ | F01N 3/2066 60/286 |
| 2010/0212292 A1* | 8/2010 | Rusch | .................. | F01N 3/2066 60/274 |
| 2011/0113759 A1 | 5/2011 | Tilinski et al. | | |

OTHER PUBLICATIONS

ISA European Patent Office, International Search Report Issued in Patent Application No. PCT/IB2014/060095, Jul. 10, 2014, WIPO, 3 pages.

* cited by examiner

REDUCTANT INJECTION IN AN EXHAUST SYSTEM

CROSS REFERENCE TO RELATED APPLICATIONS

The present application is a U.S. National Phase of International Patent Application Serial No. PCT/IB2014/060095, entitled "Reductant Injection in an Exhaust System," filed on Mar. 24, 2014, which claims priority to Great Britain Patent Application No. 1306688.1, filed on Apr. 12, 2013, the entire contents of each of which are hereby incorporated by reference in their entirety for all purposes.

BACKGROUND

The present invention relates to a system for injecting a fluid reductant into an exhaust system, a method of operating the system, and a flow guide for use in the system.

To reduce NOx levels in exhaust systems, notably diesel exhaust systems, it is known to inject a reductant into the exhaust gas upstream of a Selective Catalytic Reduction (SCR) module. The reductant converts NOx to nitrogen gas and water in the presence of the SCR. Typical reductants used are ammonia or urea, with urea generally preferred for safety and handling reasons. Urea is converted to ammonia through thermal decomposition.

The liquid reductant (for example aqueous urea) may be injected by a liquid-only dosing system, or by means of an air-assisted dosing system. Air-assisted dosing provides a smaller and more uniform droplet size through a centerline injection.

A problem with such reductant injection is that the mist of droplets from the injector tip may deposit on the wall of the exhaust pipe. This reduces the efficiency of the process and, in the case of urea and low-temperature operation, can lead to deposits which partly or completely block the exhaust pipe. A high concentration of droplets on or near the wall presents a significant challenge to mix and give an even distribution of the reductant in the exhaust gas at the SCR catalyst.

It has been proposed in U.S. 2010/0212292, to provide a feed connector through which the reductant is injected and which is provided with an inlet opening for generating additional gas flow along the inner wall of the feed connector to provide a gas barrier for preventing mist droplets from depositing on the inside wall of the feed connector or the exhaust pipe. WO 2011/106487 discloses a system for injecting a liquid reductant into an exhaust gas via an internal cone disposed in and generally parallel to the exhaust pipe. A reductant injector is in fluid communication with the cone. The cone has holes to permit inward flow of exhaust gas for creating a drag force on the injected liquid reductant. The drag force is said to increase the travel time of droplets from the injector to the SCR catalytic converter, allowing greater heating and consequently greater evaporation and/or thermal decomposition of the urea or other reductant.

Injecting aqueous urea reductant liquid on a bend in the exhaust pipe has a number of performance and practical benefits, including maximizing the downstream mixing length, providing more packaging flexibility and reducing injector temperature issues. However, placing the injector on the bend results in the majority of the spray following the main exhaust flow, particularly if the droplets are fine (as in air-assist injection systems). Even with high initial injection droplet velocity, the droplet inertia is small in comparison to the drag forces exerted by the main exhaust flow. The result of this is that the majority of droplets impinge on the wall of the exhaust pipe, losing any benefits of the small droplets for mixing and breakdown to ammonia (on evaporation and turbulent dispersion).

SUMMARY OF THE INVENTION

Aspects of the invention are specified in the independent claims. Preferred features are specified in the dependent claims.

BRIEF DESCRIPTION OF THE DRAWINGS

The invention will now be further described, by way of example only, with reference to the following drawings.

DETAILED DESCRIPTION

Figure 1:
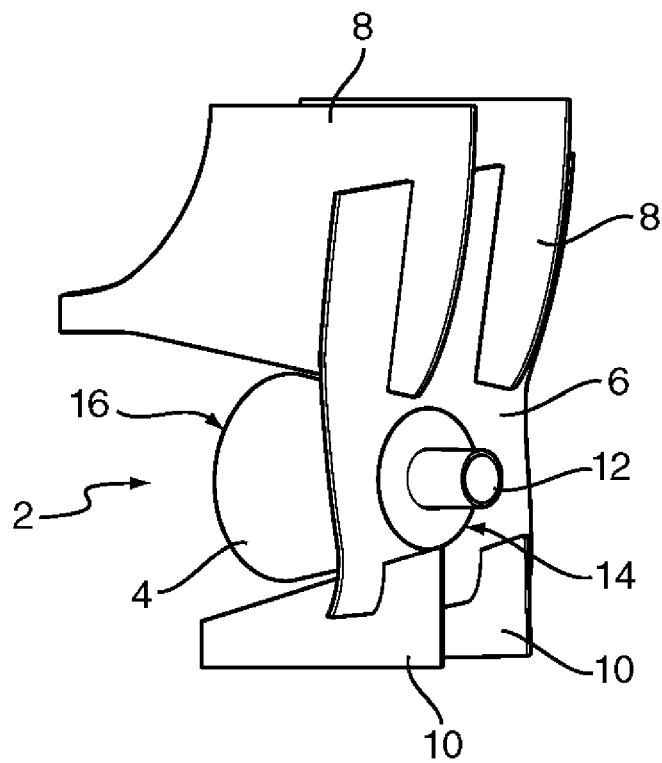
FIG. 1 is a perspective view of an assembly for use in an exhaust system in accordance with an aspect of the present disclosure.
Figure 2:
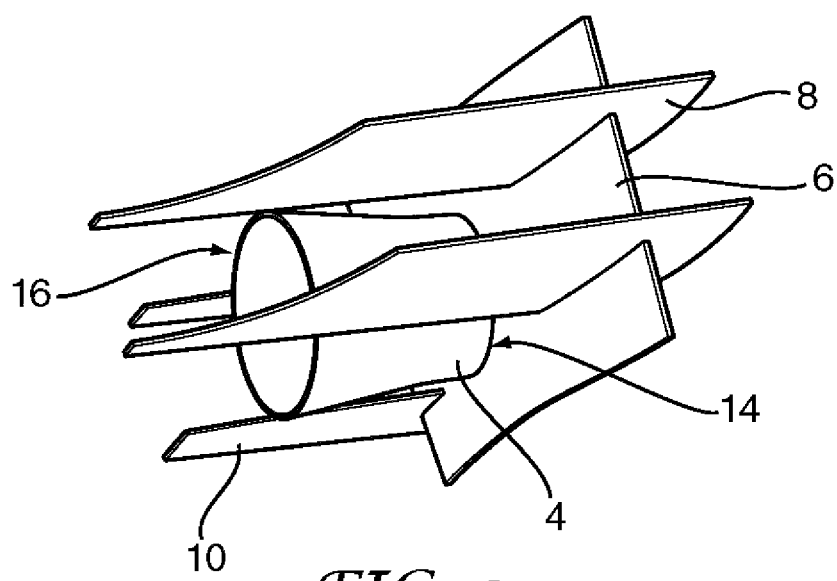
FIG. 2 shows a second perspective view of an assembly for use in the exhaust system in accordance with an aspect of the present disclosure.
Figure 3:
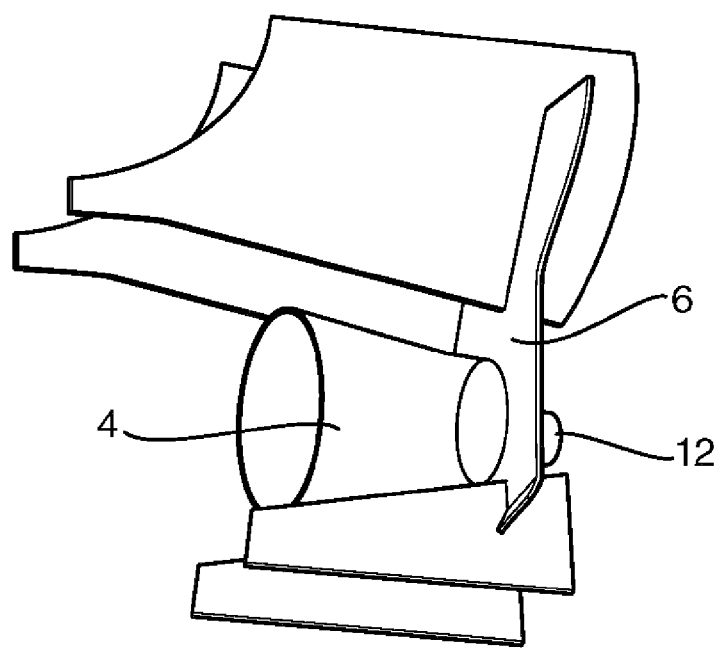
FIG. 3 shows a third perspective view of an assembly for use in the exhaust system in accordance with an aspect of the present disclosure.
Figure 4:
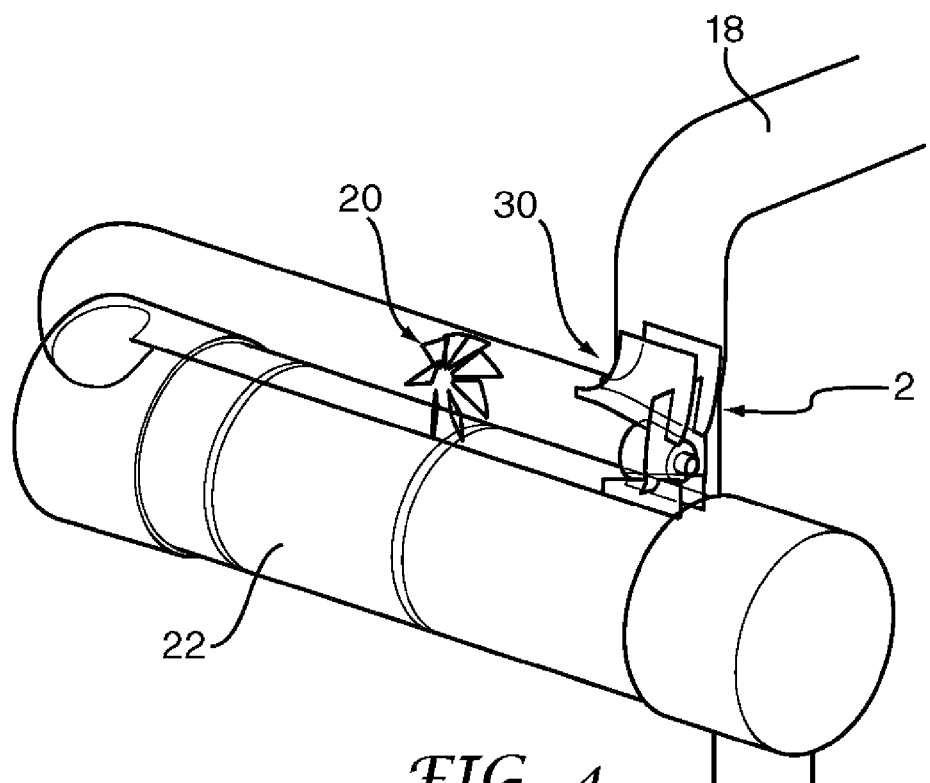
FIG. 4 illustrates an exhaust system in accordance with an embodiment of the present disclosure.
Figure 5:
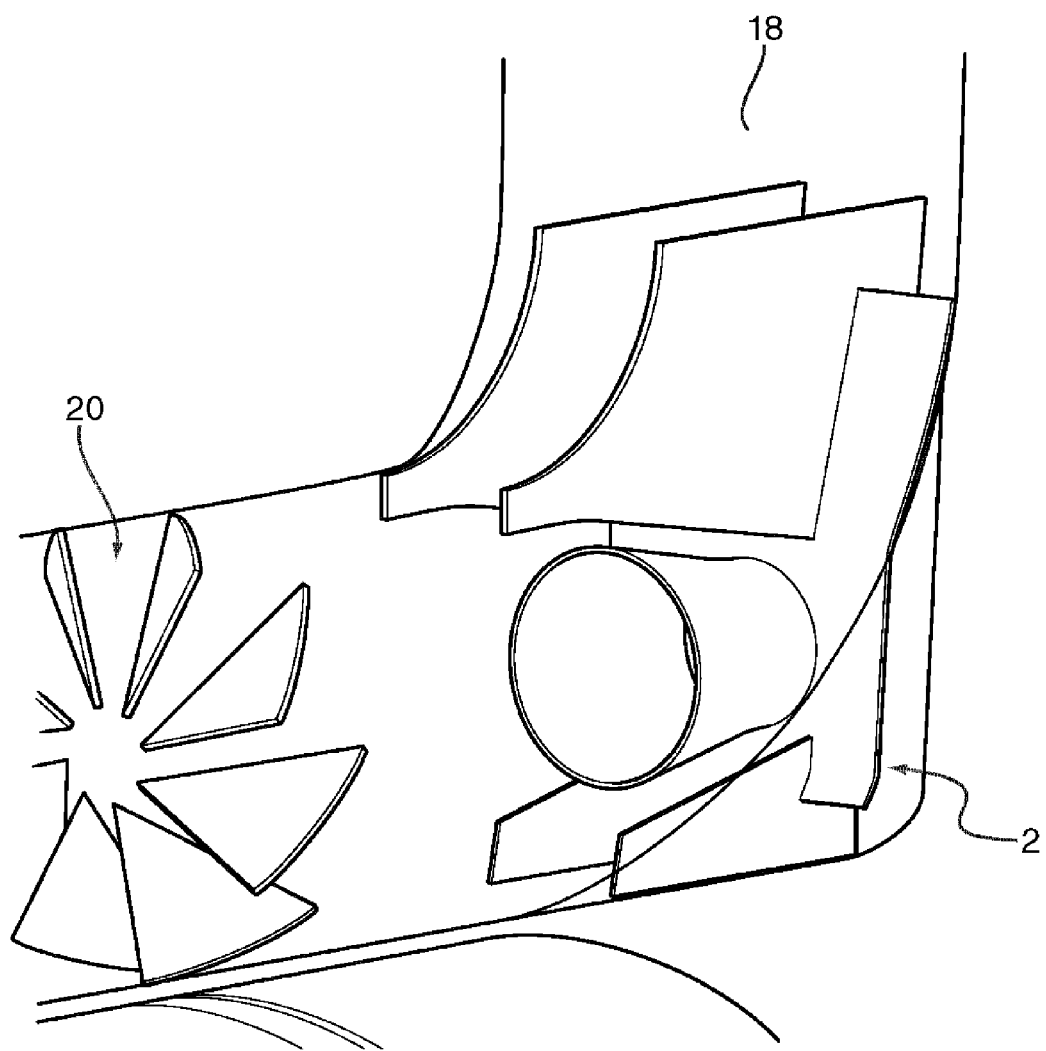
FIG. 5 shows details of part of the system of FIG. 4.
Figure 6:
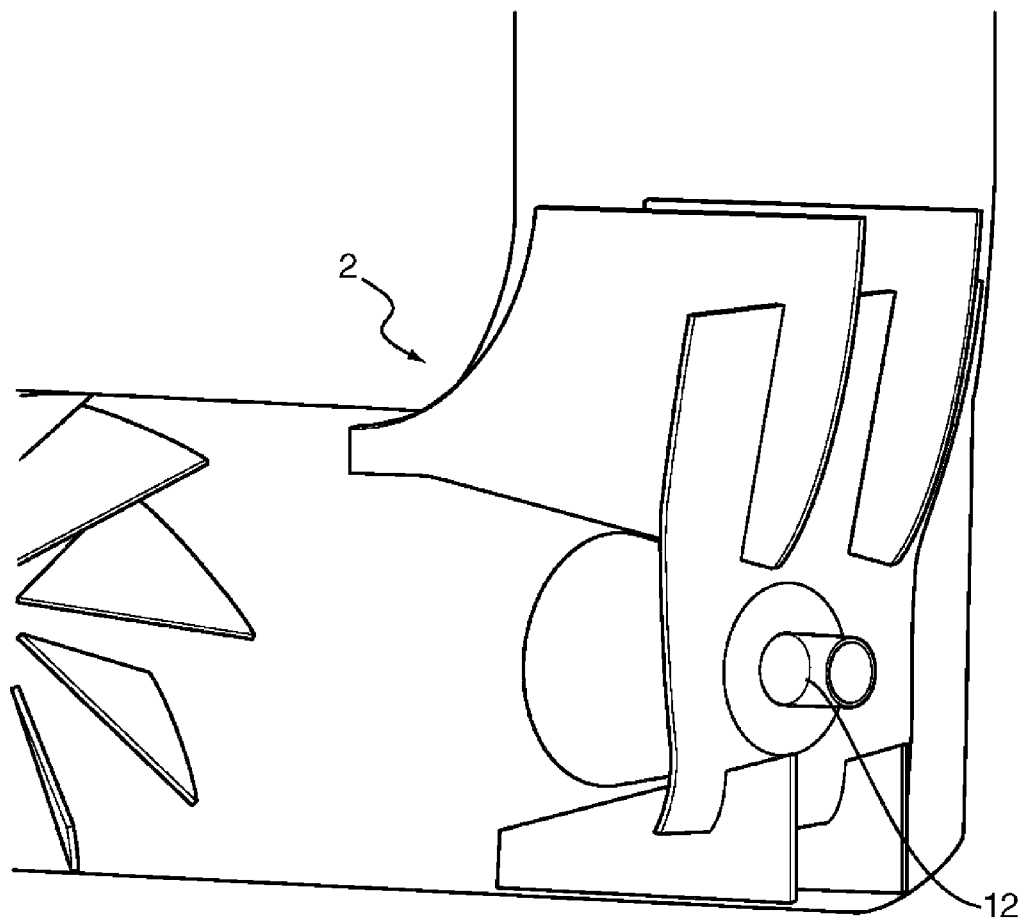
FIG. 6 shows additional details of part of the system of FIG. 4.
Figure 7:
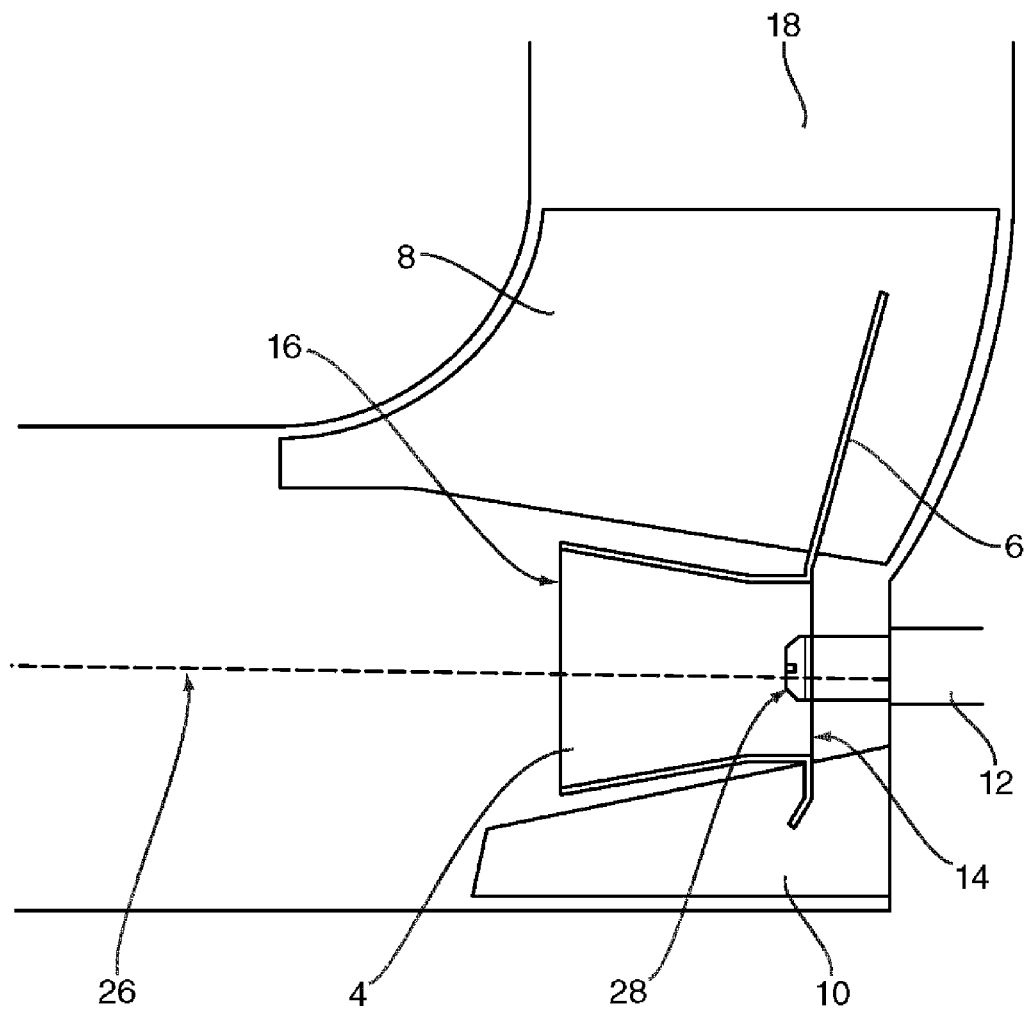
FIG. 7 is a vertical sectional view of part of the system of FIG. 4.

Referring to FIG. 4, an engine exhaust system comprises an exhaust pipe 18 having a bend 30 routing an exhaust flow in a curved path. The exhaust pipe 18 has an interior surface and is in fluid communication with an SCR catalytic converter 22 downstream of the bend 30. A flow guide assembly 2 (best shown in FIGS. 1-3 and 7) is used to inject droplets of a liquid reductant such as aqueous urea into the exhaust gas stream where the droplets are optionally further mixed, in this example by an 8-blade mixer 20 (best shown in FIGS. 5 and 6).

Figure 8:
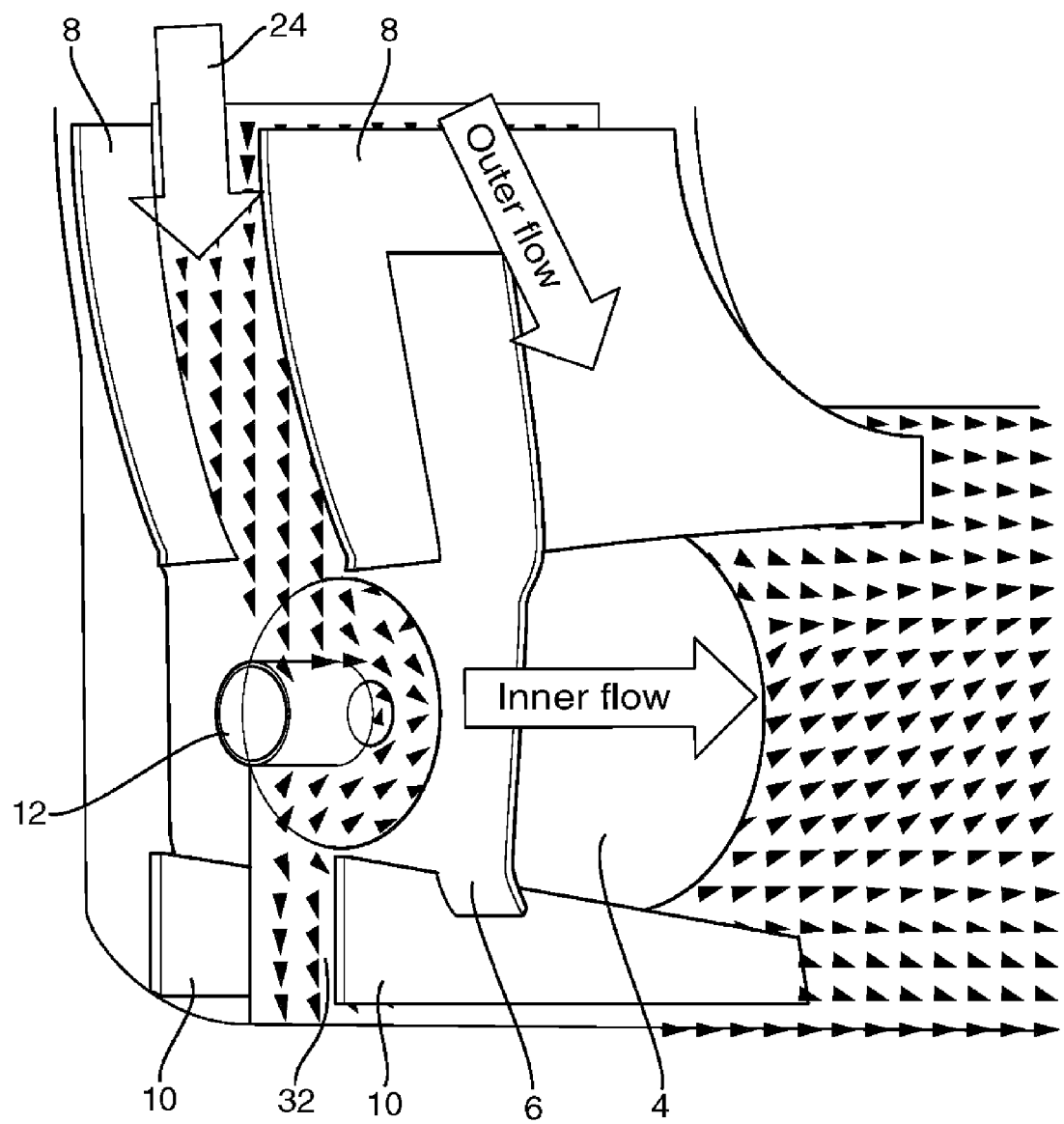
FIG. 8 shows a simulation of gas flow in a system in accordance with an embodiment of the present disclosure.
Figure 9:
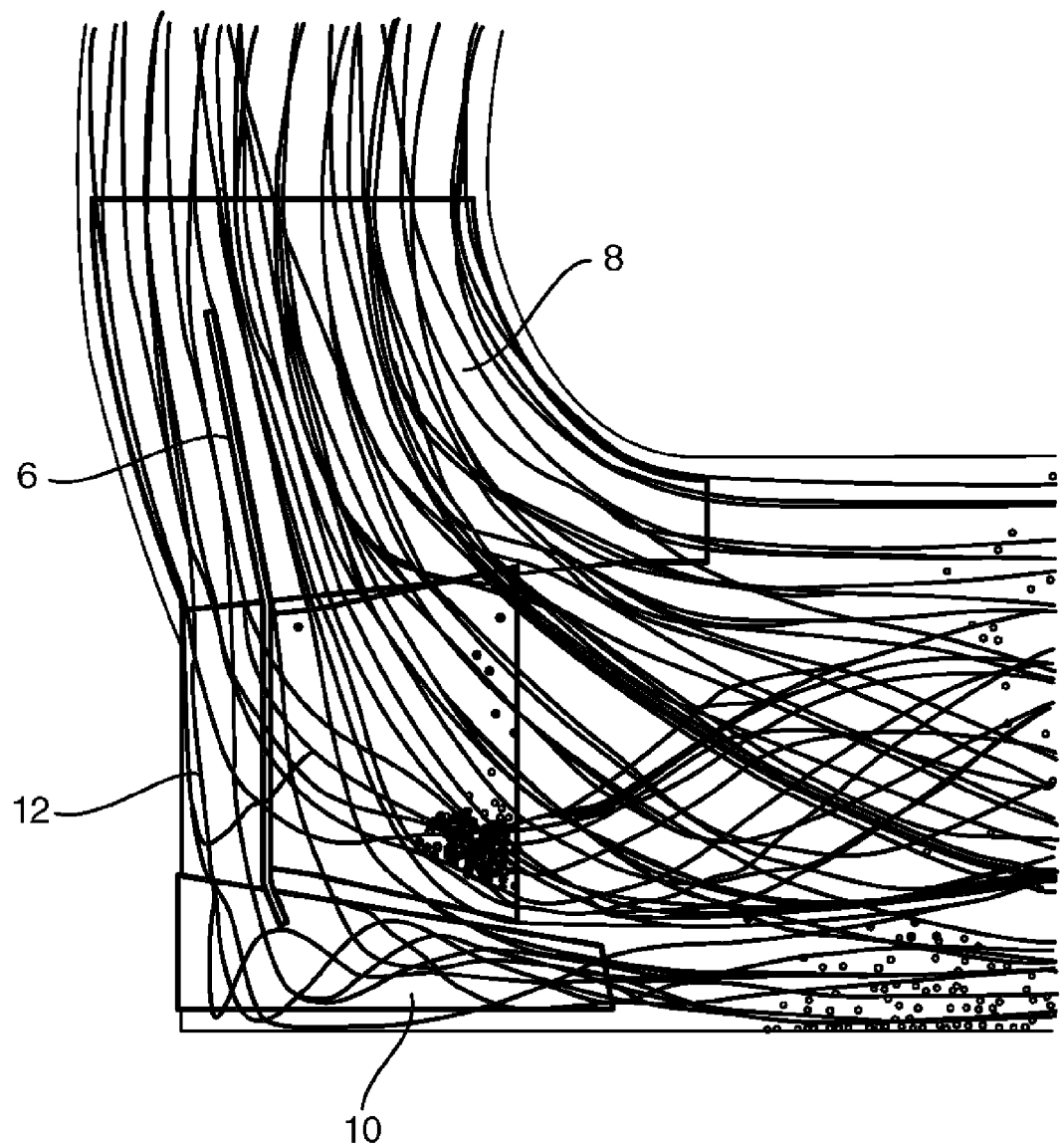
FIG. 9 shows a simulation of the smooth transition of gas flow in a system in accordance with an embodiment of the present disclosure.

An injector 12 is mounted to the exterior of the exhaust pipe and has an injector tip 28 (FIG. 7) which is disposed within the interior of the exhaust pipe 18 at the bend 30, for injecting liquid reductant into the exhaust pipe 18. A shield member 4 is mounted in the exhaust pipe 18 and spaced apart from the interior surface of the exhaust pipe. The shield member 4 is a generally tubular or (in this example) frustoconical structure having an open proximal end 14 and an open distal end 16. The proximal end 14 is disposed such that the injector tip 28 is inside the shield member 4. The distal end 16 is disposed at or towards a centerline 26 of the exhaust pipe 18. A vane 6 is mounted on the shield member 4 and arranged and adapted to direct a proportion of exhaust flow 24 (FIG. 8) from upstream of the bend in a substantially arcuate path into the proximal end 14 of the shield member 4.

The injector 12 in this example is an air assisted system, but the invention could also be used with an airless system and may provide an advantage of reduction in the risk of deposits building up on the injector tip 28.

It is preferred that the shield member 4 has a frustoconical shape, with the proximal end 14 being narrower than the distal end 16 so that the diverging internal walls more readily accommodate a diverging droplet spray from the injector tip 28 without the droplets coming into contact with the wall.

The system creates a more uniform flow around the injector 12 by separating a proportion of the exhaust flow and guiding it past the injector in a uniform flow. This process is aided by part of the gas flow being directed behind the shield member 4 and through the space 32 (FIG. 8) between the shield member 4 and an adjacent interior surface of the exhaust pipe on a downstream side of the shield member.

By ensuring that the diverted gas prescribes a path in which there is a smooth transition from the upstream flow, following the path of the bend, into the proximal end 14 of the shield member 4 from behind, most of the momentum of the diverted gas flow is available to provide a cushioning or shielding layer between the central mist of reductant droplets from the injector tip 28 and the interior surface of the shield member 4. The shielded mist of droplets is delivered from the distal end 16 of the shield member 4 to a centerline 26 of the exhaust pipe 18. The droplets are travelling substantially along the centerline 26, helping to reduce the likelihood of their impinging on the internal surface of the exhaust pipe and forming a liquid film. This also provides a good distribution of the droplets within the exhaust gas, reducing the further mixing required to give an even distribution of reductant within the exhaust flow, required for high NOx conversion. A simulation of the smooth transition of the diverted gas is shown in FIG. 9 by means of lines denoting gas flow. The diverted gas follows a generally arcuate path behind the vane 6 into the shield member 4 with little loss of momentum.

Diverting some of the gas through the space 32 provides an additional cushion or shielding effect to deter reductant droplets from coming into contact with the downstream internal surface of the exhaust pipe 18 after the exit from the distal end 16 of the shield member 4. By reducing the formation of a liquid film, the risk of deposits and a consequent impact on NOx reduction is reduced.

Where the main exhaust flow (Outer Flow—FIG. 8) and the flow from the injector 12 (Inner Flow) combine, the system thus facilitates droplet distribution for further mixing. The main exhaust gas provides an outer flow all around the injector inner flow because of the size of the shield 4 and the space 32 underneath the shield.

The vane 6 may direct 10-30% of gas from the main exhaust stream, preferably about 15%.

In simulations, we have found that the combination of the shield member 4 and vane 6 is sufficient to achieve the benefits of delivery of a greater proportion of reductant droplets to the catalyst 22 if the upstream geometry is such as to provide a smooth gas flow. However, if the upstream geometry is less than ideal, for example if the pipe has one or more bends upstream, the incoming gas flow may have an element of swirl that will tend to reduce the efficiency of the system by bringing reductant into contact with internal surfaces of the exhaust pipe.

To reduce the influence of upstream geometry, one or more flow straightening members 8, 10 may be mounted in relation to the shield member 4. In the present example, a pair of upper flow straightening members 8 is mounted on the vane 6 upstream of the shield member 4 and a pair of lower flow straightening members 10 is mounted on the vane 6 downstream of the shield member 4. In this embodiment, each flow straightening member is a wall or plate mounted on the vane 6 and disposed substantially perpendicularly to a local plane of the vane. Preferably the major planes of the or each flow straightening member are substantially parallel to the internal diameter of the exhaust pipe.

The exhaust system may be manufactured with the flow guide assembly 2 mounted in the exhaust pipe at a bend, and with the injector mounted so that the injector tip is in the shield member. However, it is envisaged that the flow guide assembly could be retrofitted to some exhaust systems to achieve the benefits of the invention. Accordingly, another aspect of the invention provides a flow guide assembly for mounting in an exhaust system.

The invention accordingly provides a system and method for improving the efficiency of delivery of reductant to SCR catalyst in an engine exhaust system.

The articles “a” and “an” are used herein to mean “at least one” unless the context otherwise requires.

The invention claimed is:

1. An engine exhaust system comprising:

an exhaust pipe having a bend routing an exhaust flow in a curved path, the exhaust pipe having an interior surface and being in fluid communication with a catalyst downstream of the bend;

an injector mounted to an exterior of the exhaust pipe and having an injector tip which is disposed within an interior of the exhaust pipe at the bend, for injecting liquid reductant into the exhaust pipe;

a shield member mounted in the exhaust pipe and spaced apart from the interior surface of the exhaust pipe, the shield member comprising a generally tubular or frustoconical structure having an open proximal end and an open distal end, the proximal end being disposed such that the injector tip is inside the shield member, the distal end being disposed at or towards a centerline of the exhaust pipe;

a vane mounted in relation to the shield member, the vane being arranged and adapted to direct a proportion of exhaust flow from upstream of the bend in a substantially arcuate path into the proximal end of the shield member; and at least one flow straightening member mounted in relation to the vane, for reducing swirl in exhaust flow from upstream of the shield member, wherein said at least one flow straightening member is disposed substantially perpendicularly to the vane.

2. The system according to claim 1, wherein the vane directs part of the exhaust flow through a space between the proximal end of the shield member and the interior surface of the exhaust pipe adjacent to the injector, and through a space between the shield member and an adjacent interior surface of the exhaust pipe on a downstream side of the shield member, and further comprising a mixing element disposed between the injector and the catalyst to mix the reductant into the exhaust flow.

3. The system according to claim 2, wherein the vane is arranged and adapted to direct 10-30% of a volume of exhaust flow through the shield member and/or the space between the shield member and the adjacent interior surface of the exhaust pipe on the downstream side of the shield member.

4. The system according to claim 3, wherein the vane is arranged and adapted to direct about 15% of said volume.

5. The system according to claim 1, wherein the shield member is disposed such that, in use, droplets of reductant liquid will exit the distal end at substantially the centerline of the exhaust pipe having a direction of travel substantially along said centerline, and wherein the vane is coupled to the shield member substantially perpendicularly to a central axis of the shield member.

6. The system according to claim 1, wherein said at least one flow straightening member is a wall or a plate and extends past an end of the vane in a direction away from the generally tubular or frustoconical structure of the shield member.

7. The system according to claim 6, wherein said at least one flow straightening member extends past the distal end of the shield member in a direction of the centerline.

8. The system according to claim 6, wherein at least one flow straightening member is provided upstream of the shield member and at least one flow straightening member is provided downstream of the shield member, and wherein the flow straightening members are mounted substantially parallel to a central axis of the shield member.

9. The system according to claim 7, wherein a pair of flow straightening members is provided upstream of the shield member and a pair of flow straightening members is provided downstream of the shield member, and wherein the flow straightening members are spaced away from an outer surface of the generally tubular or frustoconical structure.

10. The system according to claim 1, wherein the shield member is substantially frustoconical, with the proximal end being narrower than the distal end, wherein the catalyst is a selective catalytic reduction (SCR) device disposed downstream of the injector, and wherein the liquid reductant converts NOx to nitrogen gas and water in the presence of the SCR device, and wherein an edge of the at least one flow straightening member extends past the distal end in a direction of the centerline and is curved complementary to the bend.

11. A flow guide assembly for mounting in a bend of an exhaust pipe of an engine exhaust system having an injector mounted to an exterior of the exhaust pipe and having an injector tip which is disposed within an interior of the exhaust pipe at the bend, for injecting liquid reductant into the exhaust pipe, the flow guide assembly comprising:
- a shield member comprising a generally tubular or frustoconical structure having an open proximal end for receiving the injector tip and an open distal end;
- a vane around the proximal end of the shield member, for directing a proportion of exhaust gas into said proximal end when in use mounted in the exhaust pipe at the bend; and
- at least one flow straightening member mounted directly to the vane.

12. The assembly according to claim 11, wherein said at least one flow straightening member is a wall or plate mounted on the vane and disposed substantially perpendicularly to a local plane of the vane, and wherein the vane is coupled to the shield member, the vane being substantially perpendicular to a central axis of the shield member.

13. The assembly according to claim 11, wherein two pairs of flow straightening members are provided on the vane, one pair on each side of the shield member, the flow straightening members being substantially parallel to a central axis of the shield member, and wherein the flow straightening members extend past a distal end of the shield member in a direction of a centerline.

14. The assembly according to claim 11, wherein the shield member is substantially frustoconical, and further comprising an 8-blade mixer disposed between the injector and a selective catalytic reduction (SCR) device, the SCR device disposed downstream of the injector.

15. A method for injection of a liquid reductant into an engine exhaust system comprising:
- providing an exhaust pipe having a bend routing an exhaust flow in a curved path, the exhaust pipe having an interior surface and being in fluid communication with a catalyst downstream of the bend;
- providing an injector mounted to an exterior of the exhaust pipe and having an injector tip which is disposed within an interior of the exhaust pipe at the bend;
- providing a shield member mounted in the exhaust pipe and spaced apart from the interior surface of the exhaust pipe, the shield member comprising a generally tubular or frustoconical structure having an open proximal end and an open distal end, the proximal end being disposed such that the injector tip is inside the shield member, the distal end being disposed at or towards a centerline of the exhaust pipe;
- providing a vane mounted in relation to the shield member, the vane being arranged and adapted to direct a proportion of exhaust flow from upstream of the bend in a substantially arcuate path into the proximal end of the shield member;
- providing a flow straightening member formed as a flat plate with a curved edge extending past the distal end of the shield member toward an opposite side of the exhaust pipe, wherein the flat plate is mounted directly to the vane; and
- injecting the liquid reductant through the injector towards the distal end of the shield member.

16. The system according to claim 3, wherein the shield member is disposed such that, in use, droplets of reductant liquid will exit the distal end at substantially the centerline of the exhaust pipe having a direction of travel substantially along said centerline.

17. The system according to claim 9, wherein the shield member is substantially frustoconical, with the proximal end being narrower than the distal end.

18. The assembly according to claim 12, wherein two pairs of flow straightening members are provided on the vane, one pair on each side of the shield member.

19. The assembly according to claim 12, wherein the shield member is substantially frustoconical.

20. The assembly according to claim 13, wherein the shield member is substantially frustoconical.

* * * * *